United States Patent
Ramaiah et al.

(10) Patent No.: US 12,175,231 B2
(45) Date of Patent: Dec. 24, 2024

(54) SYSTEMS AND METHODS FOR THERMAL MONITORING DURING FIRMWARE UPDATES

(71) Applicant: Dell Products, L.P., Round Rock, TX (US)

(72) Inventors: Dharma Bhushan Ramaiah, Bangalore (IN); Shinose Abdul Rahiman, Bangalore (IN); Vineeth Radhakrishnan, Palakkad (IN); Rama Rao Bisa, Bangalore (IN); Mini Thottunkal Thankappan, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 70 days.

(21) Appl. No.: 17/934,806

(22) Filed: Sep. 23, 2022

(65) Prior Publication Data

US 2024/0103828 A1 Mar. 28, 2024

(51) Int. Cl.
*G06F 8/65* (2018.01)
*G06F 1/20* (2006.01)

(52) U.S. Cl.
CPC .............. *G06F 8/65* (2013.01); *G06F 1/206* (2013.01)

(58) Field of Classification Search
CPC .................................. G06F 8/65; G06F 1/206
USPC .................................................. 717/120–178
See application file for complete search history.

(56) References Cited

U.S. PATENT DOCUMENTS

| | | | | |
|---|---|---|---|---|
| 7,451,335 B2* | 11/2008 | Lindsay | .............. | H04L 41/0803 |
| | | | | 713/340 |
| 8,635,425 B1* | 1/2014 | Adogla | ..................... | G06F 8/63 |
| | | | | 714/710 |
| 8,707,290 B2* | 4/2014 | Brundridge | ............... | G06F 8/65 |
| | | | | 709/209 |
| 9,087,076 B2* | 7/2015 | Nickolov | ............ | H04L 67/1001 |
| 2006/0075276 A1* | 4/2006 | Kataria | ............... | G06F 11/1433 |
| | | | | 714/E11.135 |

(Continued)

OTHER PUBLICATIONS

Zhang, Fengwei, et al. "Using hardware features for increased debugging transparency." 2015 IEEE Symposium on Security and Privacy. IEEE, 2015.pp. 55-69 (Year: 2015).*

(Continued)

*Primary Examiner* — Satish Rampuria
(74) *Attorney, Agent, or Firm* — Fogarty LLP

(57) ABSTRACT

Systems and methods provide thermal monitoring during updates to firmware used by managed hardware of an Information Handling System (IHS). A remote access controller of the IHS, that operates separate from CPUs of the IHS, initiates a firmware update for a hardware component via a bus mastered by the remote access controller. Except for transmissions in support of the firmware update, communications on the bus are blocked. While communications on the bus are blocked, a request is detected for transmission of a portion of the firmware update to the hardware component. A time is determined for responding to the request. Prior to the time for responding, a second of the hardware components of the IHS that shares the bus mastered by the remote access controller is polled for thermal data. During the firmware update of the hardware component, closed-loop cooling of the IHS is provided using the thermal data.

20 Claims, 4 Drawing Sheets

(56) References Cited

U.S. PATENT DOCUMENTS

| | | | | |
|---|---|---|---|---|
| 2009/0063833 A1* | 3/2009 | Ho | ................... | H04L 63/101 |
| | | | | 713/1 |
| 2019/0042755 A1* | 2/2019 | Khatri | ................... | G06F 21/575 |
| 2020/0134183 A1* | 4/2020 | Rahardjo | ............... | G06F 21/572 |
| 2020/0356354 A1* | 11/2020 | Mitra | ................... | G06F 16/903 |
| 2021/0096838 A1* | 4/2021 | Samuel | ................. | G06F 21/572 |

OTHER PUBLICATIONS

Ren, Haoyu, Darko Anicic, and Thomas A. Runkler. "The synergy of complex event processing and tiny machine learning in industrial IoT." Proceedings of the 15th ACM International Conference on Distributed and Event-based Systems. 2021.pp. 126-135 (Year: 2021).*

Gao, Chao, et al. "Microcontroller based IoT system firmware security: Case studies." 2019 IEEE International Conference on Industrial Internet (ICII). IEEE, 2019. pp. 200-209 (Year: 2019).*

Patel, Naman, et al. "Towards a new thermal monitoring based framework for embedded CPS device security." IEEE Transactions on Dependable and Secure Computing 19.1 (2020): pp. 524-536. (Year: 2020).*

Jones, Phillip H., Young H. Cho, and John W. Lockwood. "An adaptive frequency control method using thermal feedback for reconfigurable hardware applications." 2006 IEEE International Conference on Field Programmable Technology. IEEE, 2006. pp. 229-236 (Year: 2006).*

* cited by examiner

SYSTEMS AND METHODS FOR THERMAL MONITORING DURING FIRMWARE UPDATES

FIELD

The present disclosure relates generally to Information Handling Systems (IHSs), and relates more particularly to managing firmware used by IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Various hardware components of an IHS may operate using firmware instructions. From time to time, it is expected that firmware utilized by hardware components of an IHS may be updated. Such firmware updates may be made in order to modify the capabilities of a particular hardware component, such as to address security vulnerabilities or to adapt the operations of the hardware component to a specific computing task. When firmware updates are made to a hardware component of an IHS, it is preferable that the IHS experience no downtime and with minimal degradation in the performance of the IHS.

SUMMARY

In various embodiments, IHSs may include: one or more CPUs utilizing one or more buses that connect to a plurality of hardware components of the IHS; and a remote access controller supporting remote management of the Information Handling System (IHS), the remote access controller comprising a logic unit and a memory device having instructions stored thereon that, upon execution by the logic unit, cause the remote access controller to: initiate a firmware update for a first of the hardware components via a bus that is mastered by the remote access controller; except for transmissions in support of the firmware update of the first hardware component, block communications on the bus; while blocking communications on the bus, detect a request for transmission of a portion of the firmware update to the first hardware component; determine a time for responding to the request by the first hardware component; prior to the time for responding to the request by the first hardware component, poll a second of the hardware components of the IHS that shares the bus mastered by the remote access controller for thermal data; and utilize the polled thermal data to provide closed-loop cooling of the IHS during the firmware update for the first hardware component.

In some IHS embodiments, the update of the firmware of the hardware component comprises a rebootless update that does not include a reboot of the IHS. In some IHS embodiments, the blocking of communications on the bus comprises blocking application-layer messaging on the bus. In some IHS embodiments, the blocked application-layer messaging on the bus comprises blocking of any PLDM communications by hardware components that share the bus with the first hardware component. In some IHS embodiments, the detection of the request for transmission of a portion of the firmware update comprises monitoring packets on the bus for transport layer communications that indicate a request by the first hardware component. In some IHS embodiments, the monitored packets are determined as a request by the first hardware component based on the detection of a transport-layer address used by the remote access controller to communication with the first hardware component. In some IHS embodiments, the bus mastered by the remote access controller comprises a sideband bus used to manage a plurality of the hardware components of the IHS. In some IHS embodiments, the sideband bus mastered by the remote access controller comprises an I2C bus. In some IHS embodiments, the second of the hardware components comprises a temperature sensor, and wherein the polling collects temperature measurements by the sensor. In some IHS embodiments, the collected temperature measurements enable the closed-loop cooling of the IHS during the update to the first hardware component.

In various additional embodiments, methods provide thermal monitoring during updates to firmware used by a managed hardware component of an Information Handling System. The methods may include: initiating, by a remote access controller of the IHS that operates separate from one or more CPUs of the IHS and that provides remote management of the IHS, a firmware update for a first of the hardware components via a bus that is mastered by the remote access controller; except for transmissions in support of the firmware update of the first hardware component, blocking communications on the bus; while blocking communications on the bus, detecting a request for transmission of a portion of the firmware update to the first hardware component; determining a time for responding to the request by the first hardware component; prior to the time for responding to the request by the first hardware component, polling a second of the hardware components of the IHS that shares the bus mastered by the remote access controller for thermal data; and providing closed-loop cooling of the IHS using the thermal data during the firmware update for the first hardware component.

In some method embodiments, the update of the firmware of the hardware component comprises a rebootless update that does not include a reboot of the IHS. In some method embodiments, the bus mastered by the remote access controller comprises a sideband bus used to manage a plurality of the hardware components of the IHS. In some method embodiments, the sideband bus mastered by the remote access controller comprises an I2C bus. In some method embodiments, the second of the hardware components comprises a temperature sensor, and wherein the polling collects temperature measurements by the sensor.

In various additional embodiments, remote access controllers support remote management of a plurality of managed hardware components of an Information Handling System. The remote access controllers may include: a logic unit and a memory device having instructions stored thereon that, upon execution by the logic unit, cause the remote access controller to: initiate a firmware update for a first of the managed hardware components via a bus that is mastered by the remote access controller; except for transmissions in support of the firmware update of the first hardware component, block communications on the bus; while blocking communications on the bus, detect a request for transmission of a portion of the firmware update to the first hardware component; determine a time for responding to the request by the first hardware component; prior to the time for responding to the request by the first hardware component, poll a second of the hardware components of the IHS that shares the bus mastered by the remote access controller for thermal data; and utilize the polled thermal data to provide closed-loop cooling of the IHS during the firmware update for the first hardware component.

In some remote access controller embodiments, the update of the firmware of the hardware component comprises a rebootless update that does not include a reboot of the IHS. In some remote access controller embodiments, the second of the hardware components comprises a temperature sensor, and wherein the polling collects temperature measurements by the sensor. In some remote access controller embodiments, the collected temperature measurements enable the closed-loop cooling of the IHS during the update to the first hardware component. In some remote access controller embodiments, the blocking of communications on the bus comprises blocking application-layer messaging on the bus.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
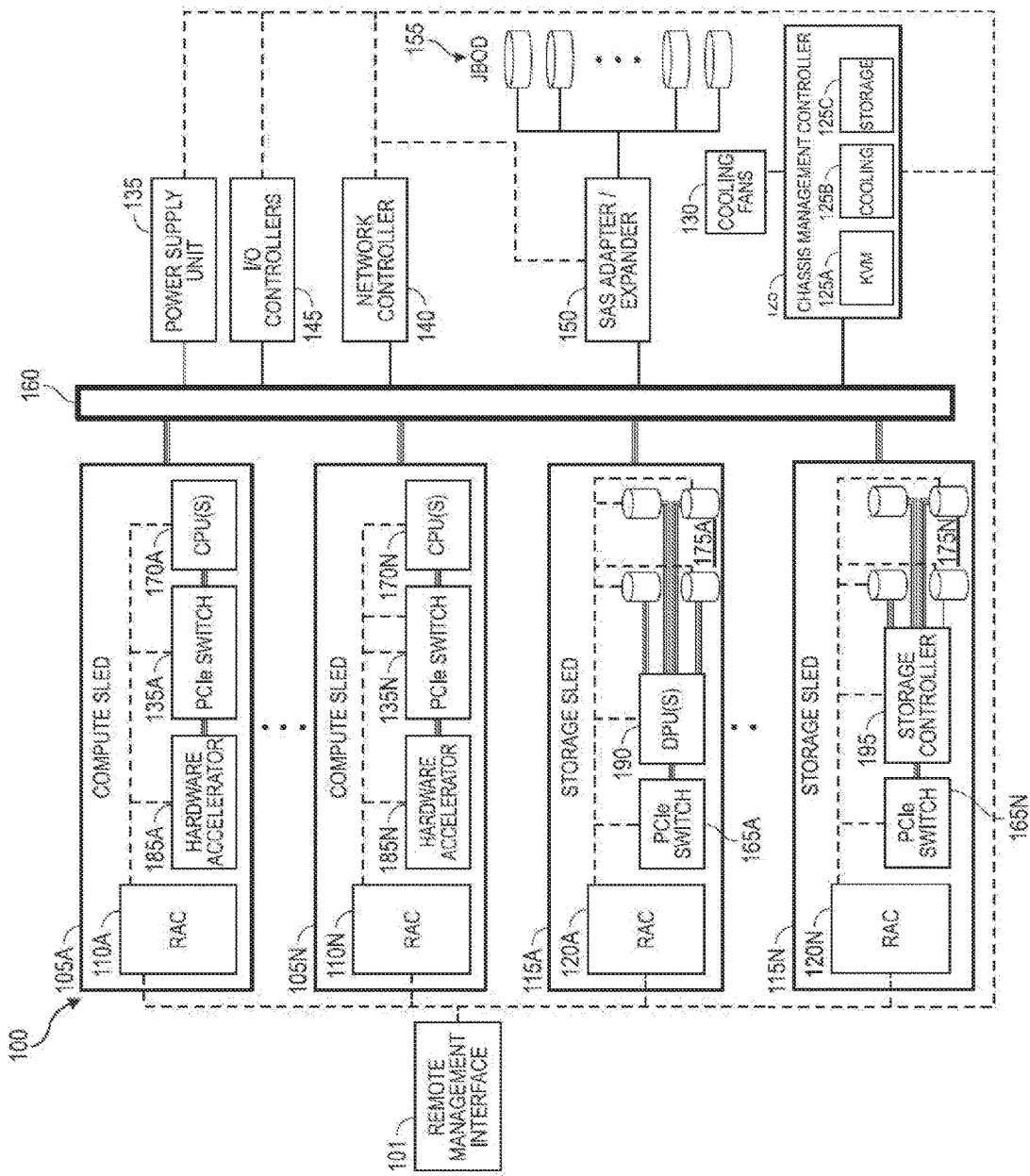
FIG. 1 is a diagram illustrating certain components of a chassis configured, according to some embodiments, for thermal monitoring during updates to firmware used by IHSs installed in the chassis.

FIG. 1 is a block diagram illustrating certain components of a chassis 100 comprising one or more compute sleds 105a-n and one or more storage sleds 115a-n that may be configured to implement the systems and methods described herein for thermal monitoring during updates to firmware used by IHSs installed in the chassis 100. Embodiments of chassis 100 may include a wide variety of hardware configurations in which one or more IHS 105a-n, 115a-n are installed in chassis 100. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware used by individual hardware components of the IHSs 105a-n, 115a-n, or by other hardware components of chassis 100, may be modified in order to update the operations that are supported by these hardware components.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational tasks, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational tasks may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated, such as to adapt the capabilities of the respective hardware accelerators 185a-n to specific computing tasks.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100. As described in additional detail below, embodiments provide capabilities for management of such cooling resources of chassis 100, and in particular providing management of cooling resources during firmware updates to hardware components installed in the chassis. Firmware updates are operations of the highest priority when determining how to allocate available resources of the chassis. In existing systems, firmware updates may be prioritized such that all other bus communications besides the firmware update are suspended. As a consequence, messages that are required for closed-loop thermal management within the IHS are suspended. Without collecting any thermal management data, such as temperature data collected from sensors, cooling systems are set to maximum cooling outputs, which may be referred to as open-loop cooling. Open loop cooling is a waste of resources and a source of significant noise within a data center, especially if many of the servers in the data center are configured in this same manner.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
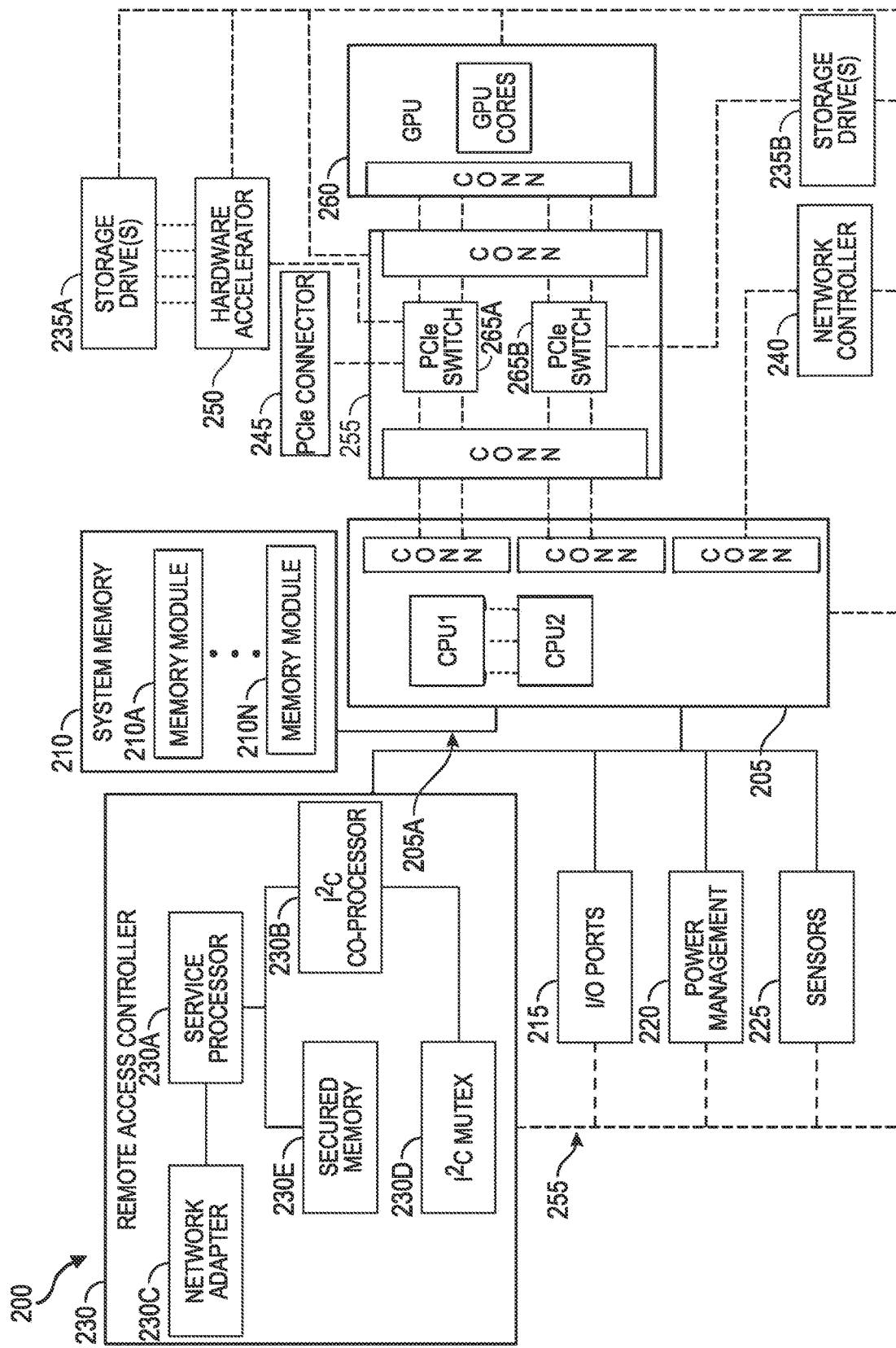
FIG. 2 is a diagram illustrating certain components of an IHS configured, according to some embodiments, for thermal monitoring during updates to firmware used by hardware components of the IHS.

In certain embodiments, each individual sled 105a-n, 115a-n-n may be an IHS such as described with regard to IHS 200 of FIG. 2. Sleds 105a-n, 115a-n may individually or collectively provide computational processing resources that may be used to support a variety of e-commerce, multimedia, business and scientific computing applications, such as artificial intelligence systems provided via cloud computing implementations. Sleds 105a-n, 115a-n are typically configured with hardware and software that provide leading-edge computational capabilities. Accordingly, services that are provided using such computing capabilities are typically provided as high-availability systems that operate with minimum downtime.

In high-availability computing systems, such as may be implemented using embodiments of chassis 100, any downtime that can be avoided is preferred. As described above, firmware updates are an expected in the administration and operation of data centers, but it is preferable to avoid any downtime in making such firmware updates. For instance, in updating the firmware of the individual hardware components of the chassis 100, it is preferable that such updates can be made without having to reboot the chassis. It is also preferable that updates to the firmware of individual hardware components of sleds 105a-n, 115a-n be likewise made without having to reboot the respective sled of the hardware component that is being updated. Rebootless firmware updates are not guaranteed. They are known to fail for reasons that are never understood. Accordingly, administrators prefer to provide the rebootless update process with exclusive use of the communication bus being used to transmit the firmware image to the hardware component being updated. As a result, thermal management messages may be prevented from transmission on the bus being used to transmit the firmware image to the hardware component. For instance, PLDM messages by thermal sensors reporting temperature measurements would not be transmitted on an I2C management bus that has been reserved for exclusive use for updating the firmware of another hardware component that also utilizes that same I2C management bus. As described in additional detail below, embodiments provide capabilities for maintaining a minimal level of cooling operations during firmware updates in a manner that gives deference to the use of communication bus resources by the rebootless firmware update process.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105a-n, 115a-n. As described in additional detail below, in various embodiments, these capabilities of the remote access controllers 110a-n, 120a-n may be utilized in updating the firmware of hardware components of chassis 100 and/or of hardware components of the sleds 110a-n, 120a-n, without having to reboot the chassis or any of the sleds 110a-n, 120a-n. In embodiments, remote access controllers 110a-n, 120a-n may implement a transport-layer communications protocol that supports rebootless firmware updates by managed components of chassis 100 while simultaneously supporting delivery of thermal management information sufficient to support closed-loop cooling operations by the IHS.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the firmware used by hardware components installed in the chassis 100. For example, remote management interface 101 may provide capabilities by which an administrator can initiate updates to the firmware utilized by all of the storage drives 175a-n installed in a chassis 100, or to the firmware utilized by all of the storage drives 175a-n of a particular model or manufacturer. In some instances, remote management interface 101 may include an inventory of the hardware, software and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such as the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, that may be programmed and adapted for specific computing tasks, such as to support machine learning or other artificial intelligence systems. Compute sleds 105a-n may include a variety of hardware components, such as hardware accelerator 185a-n and PCIe switches 135a-n, that operate using firmware that may be occasionally updated.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that is a hardware accelerator that provides access to and manages the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be in integrated component of a DPU 190. The immense data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some embodiments, storage controller 195 may provide support for RAID (Redundant Array of Independent Disks) configurations of logical and physical storage drives, such as storage drives provided by storage sled 115n. In some embodiments, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed. In some instances, a chassis 100 may include numerous storage drives 175a-n, 155 that are identical, or nearly identical, such as arrays of SSDs of the same manufacturer and model. Accordingly, any firmware updates to storage drives 175a-n, 155 requires the updates to be applied within each of these topologies being supported by the chassis 100. Despite the large number of different storage drive topologies that may be supported by an individual chassis 100, the firmware used by each of these storage devices 175a-n, 155 may be occasionally updated. In some instances, firmware updates may be limited to a single storage drive, but in other instances, a set of firmware updates may be initiated for a large number of storage drives, such as for all SSDs installed in chassis 100.

In some instances, errors encountered during updates to the firmware of one hardware component of a chassis 100, may preclude or delay any additional firmware updates to other hardware components of the chassis. For example, a set of updates to the firmware utilized by twenty-five identical SSDs installed in chassis 100 may be serialized in order to support fault tolerance with respect to possible data loss. When sets of such firmware updates are serialized, any errors that are encountered during updates to the firmware of any of these SSDs prevents, or at least delays, any additional firmware updates to the remaining SSDs. This prevents data loss from multiple SSDs being simultaneously rendered inoperable due to failures in the updates for the firmware of the SSDs. In order to minimize the occurrence of such problems during firmware updates while still avoiding open loop cooling, embodiments provide capabilities for supporting exclusive use of application-layer messaging on a management bus to a rebootless firmware update process while still supporting a minimal level of thermal monitoring sufficient to support closed-loop cooling during the rebootless firmware update.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for thermal monitoring during updates to firmware used by hardware components of the IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100.

IHS 200 may utilize one or more system processors 205, that may be referred to as CPUs (central processing units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated. In some embodiments, network controller 240 may be a Smart-NIC that includes programmable capabilities for use in offloading the processing of certain functions, such as signal processing operations or machine learning computations, from CPUs 205. In some instances, the programmable capabilities of a SmartNIC 240 may be modified through updated firmware instructions that are pushed to the Smart-NIC 240.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. Each of the PCIe switches 265a-b may operate according to firmware instructions that may be occasionally updated.

Using the available PCIe lanes, the PCIe switches 265a-b may be used to implement a PCIe switch fabric. Also through this switch fabric, PCIe NVMe (Non-Volatile Memory Express) transmission may be supported and utilized in high-speed communications with SSDs, such as storage drives 235a-b, of the IHS 200. Also through this switch fabric, PCIe VDM (Vendor Defined Messaging) may be supported and utilized in managing PCIe-compliant hardware components of the IHS 200, such as in updating the firmware utilized by the hardware components.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated.

As illustrated, PCIe switch 265a is coupled via a PCIe link to a hardware accelerator 250, such as a DPU, Smart-NIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250a-b may include MIPS (microprocessor without interlocked pipeline stages) cores, RISC-V cores, or CISC (complex instruction set computing) (i.e., x86) cores. The programmable capabilities of hardware accelerator 250 may operate according to firmware instructions that may be occasionally updated.

In the illustrated embodiment, the programmable capabilities of hardware accelerator 250 implement functions used to support storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various embodiments, hardware accelerator 250 may support high-bandwidth connections, such as PCIe connections, with networking devices in implementing functions of a network switch, compression and codec functions, virtualization operations or cryptographic functions.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some instances, GPUs may be utilized as programmable computing resources for offloading other functions from CPUs 205, in the same manner as hardware accelerator 250. GPUs 260 may operate according to firmware instructions that may be occasionally updated.

As illustrated in FIG. 2, PCIe switches 265a-b may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to IHS. Through couplings to PCIe connectors 245a, a variety of data storage devices, graphics processors and network interface cards may be coupled to IHS 200, thus supporting a wide variety of topologies of devices that may be coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for updating firmware used by managed hardware components of IHS 200, may operate using validated instructions, and thus within the root of trust of IHS 200.

In some embodiments, remote access controller 230 may include a service processor 230a, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard.

As indicated, remote access controller 230 may include a secured memory 230e for exclusive use by the remote access controller in support of management operations. In embodiments, a firmware image that includes a firmware update for a managed hardware component 205, 235a-b, 240, 250, 255, 260 is received and managed by remote access controller 230. In some instances, received firmware images may be temporarily stored in the secured memory 230e of remote access controller 230 until the firmware update can be delivered to the managed hardware component 205, 235a-b, 240, 250, 255, 260, where the firmware image may be transmitted to these hardware components via the inband or sideband signaling pathways supported by the remote access controller 230.

In some embodiments, remote access controller 230 may implement monitoring and management operations using MCTP (Management Component Transport Protocol) messages that may be communicated to managed devices 205, 235a-b, 240, 250, 255, 260 via management connections supported by a sideband bus 255. In some instances, the sideband management connections supported by remote access controller 230 may include PLDM (Platform Level Data Model) management communications with the managed devices 205, 235a-b, 240, 250, 255, 260 of IHS 200. In some embodiments, the remote access controller 230 may additionally or alternatively use MCTP messaging to transmit Vendor Defined Messages (VDMs) via the in-line PCIe switch fabric supported by PCIe switches 265a-b.

In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. However, as described, in existing systems, closed-loop cooling may be abandoned during firmware updates, due to restrictions on bus traffic that limit all communications other than those in support of the firmware update. Such restrictions may prevent delivery of some sensor 225 data that reports collected temperature information. In order to ensure that any overheating is avoided, existing systems resort to open-loop cooling, thus utilizing maximum cooling resources. As described in additional detail below, in embodiments, remote access controller 230 may be configured to provide exclusive use of application-layer bus communications to a firmware update process, while utilizing lower-level transport-layer communications to collect minimum amounts of data from sensors 225 to support closed-loop cooling throughout the firmware update.

As illustrated, remote access controller 230 may include a network adapter 230c that provides the remote access controller with network access that is separate from the network controller 240 utilized by other hardware components of the IHS 200. Through secure connections supported by network adapter 230c, remote access controller 230 communicates management information with remote management interface 101. In support of remote monitoring functions, network adapter 230c may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235a-b, 240, 250, 255, 260 of the IHS 200 through the operation of an I2C multiplexer 230d of the remote access controller. As illustrated in FIG. 2, the managed devices 205, 235a-b, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230a of remote access controller 230 may rely on an I2C co-processor 230b to implement sideband I2C communications between the remote access controller 230 and the managed hardware components 205, 235a-b, 240, 250, 255, 260 of the IHS 200. The I2C co-processor 230b may be a specialized co-processor or micro-controller that is configured to implement a I2C bus interface used to support communications with managed hardware components 205, 235a-b, 240, 250, 255, 260 of IHS. In some embodiments, the I2C co-processor 230b may be an integrated circuit on the same die as the service processor 230a, such as a peripheral system-on-chip feature that may be provided by the service processor 230a. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235a-b, 240, 250, 255, 260.

As illustrated in FIG. 2, remote access controller 230 includes an I2C mutex 230d that couples the remote access controller to various managed hardware components 205, 235a-b, 240, 250, 255, 260 via a sideband management I2C bus 255. The remote access controller 230 utilizes this sideband bus 255 in communicating management commands, such as PLDM commands, to the managed hardware components. As the master of the sideband bus 255, the remote access controller 230 allocates use of the bus to each of the managed hardware components 205, 235a-b, 240, 250, 255, 260. For instance, operations of the I2C co-processor 230b may direct the I2C mutex 230d to switch between different available I2C busses that may each connect to multiple managed hardware components. The I2C co-processor 230b may allocate limited time slices for bus communications by each of the managed components, where each managed component has exclusive use of the bus for its allocated time slice.

As described in additional detail below, in embodiments, the remote access controller 230 supports firmware updates by managed hardware components 205, 235a-b, 240, 250, 255, 260 by granting exclusive use of a sideband management bus 255 for application-layer communications in support of a firmware update to these components, with the I2C controller 230b suspending the allocation of time slices to all of the other hardware components sharing this bus 255, thus preventing PLDM management communications by these suspended hardware components. However, in embodiments, I2C co-processor 230b may be configured to support minimal transport-layer signaling with suspended hardware components in order to collect sufficient thermal information to support closed loop cooling of the IHS. In these embodiments, once exclusive use of application-layer communications on bus 255 has been granted to a managed hardware component, the I2C coprocessor 230b monitors for transport layer communications on this bus 255 that indicate an interval during which these minimal operations in support of closed-loop cooling of IHS 200 may be completed, without disrupting the exclusive use of application-layer communications on bus 255.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
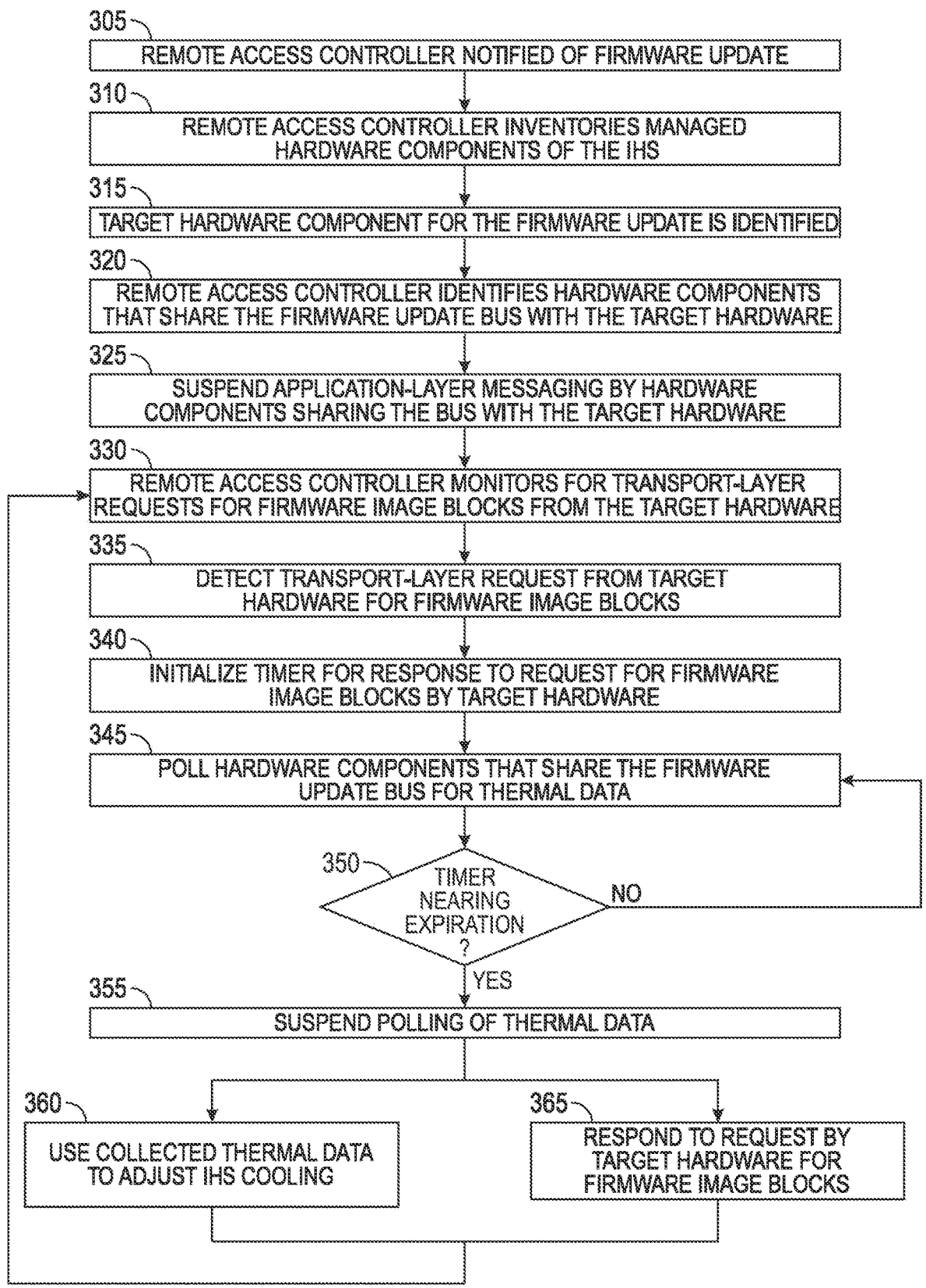
FIG. 3 is a flowchart describing certain steps of a method, according to some embodiments, for thermal monitoring during updates to firmware used by hardware components of an IHS.
Figure 4:
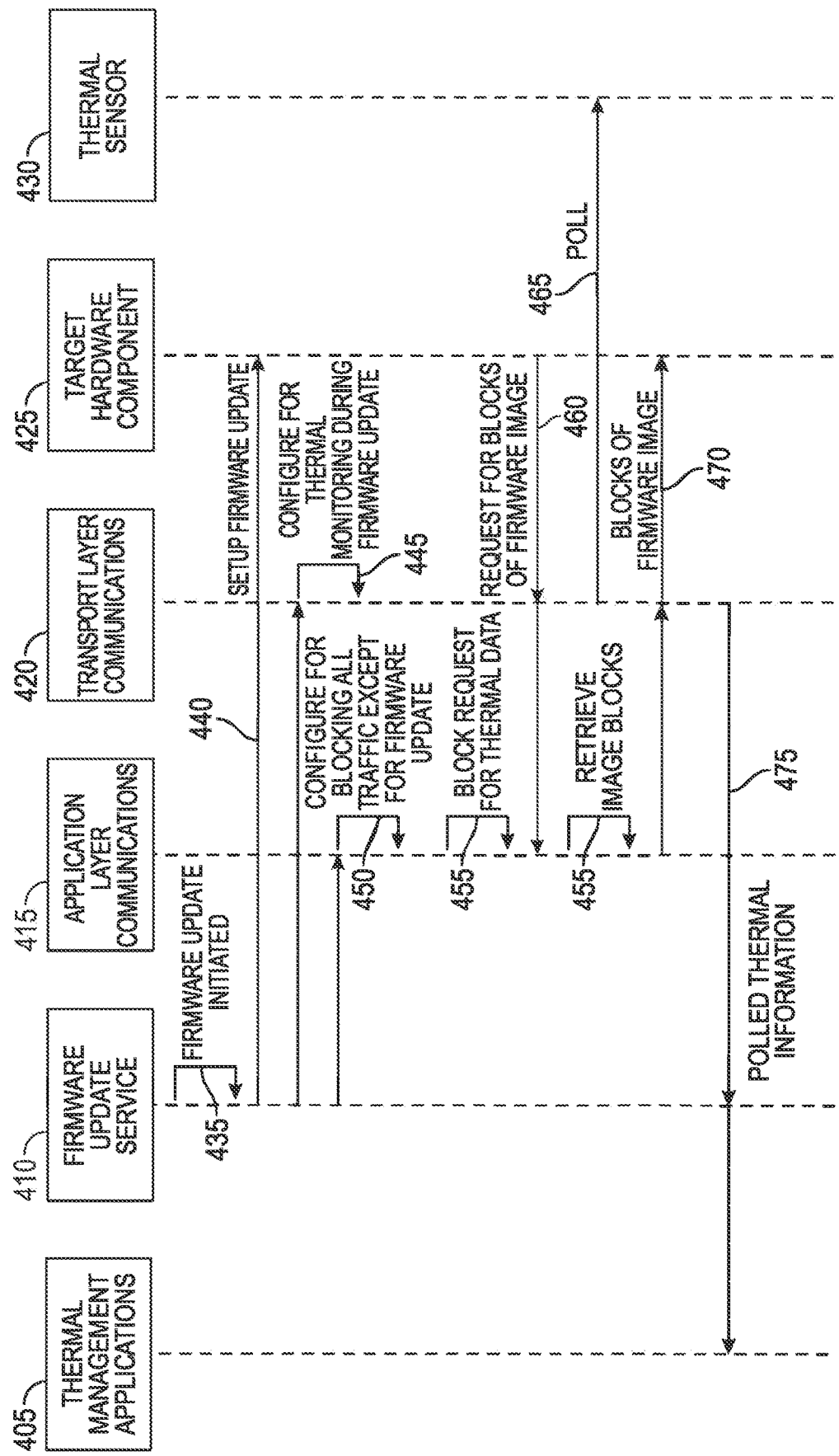
FIG. 4 is a swim lane diagram illustrations operations by certain components of a system, according to some embodiments, for thermal monitoring during firmware updates to hardware components of an IHS.

FIG. 3 is a flowchart describing certain steps of a method, according to some embodiments, for thermal monitoring during updates to firmware used by hardware components of an IHS, such as the IHSs described with regard to FIGS. 1 and 2. FIG. 4 is a swim lane diagram illustrations operations by certain components of a system, according to some embodiments, for thermal monitoring during firmware updates to hardware components of an IHS. Embodiments may begin, at 305, with the receipt of a notification that updated firmware is available for a managed hardware component of an IHS. As described above, an IHS may include a remote access controller that provides remote management of an IHS, and in many instances, also provides remote management of individual hardware components of an IHS. In embodiments, a firmware update service 410 operating within a secure execution environment of a remote access controller of an IHS is tasked with updating firmware that is utilized by managed hardware components of the IHS. In response to the notification of an available firmware update, at 435, this firmware update service 410 initiates an update that supports error-free firmware updates while still collecting sufficient sensor data to support closed-loop cooling of an IHS.

As described, data center administrators may utilize remote management tools to push firmware updates to managed hardware components operating within the data center. For example, a data center administrator may initiate operations for updating the firmware utilized by all SSDs of a certain type within a chassis (that may include over 20 SSDs), where the firmware update may be initiated in order to address a security vulnerability in a particular type of SSD, such as SSDs of a specific model number. Such types of firmware updates may be pushed to the remote access controllers of the IHSs that include the particular type of hardware component that meet the criteria set forth for the firmware update, with the remote access controllers then responsible for completing the updates to the firmware of managed hardware components of the IHS.

Once a notification of updates to the firmware of a managed component of an IHS has been received, at 310, the remote access controller may generate an inventory of the managed hardware components of the IHS. In some embodiments, the remote access controller may generate this inventory through the broadcast of management commands via inband and sideband buses available to the remote access controller, such as the signaling pathways described with regard to the remote access controller 230 of FIG. 2. For instance, PLDM broadcasts on I2C sideband management buses and on certain inband buses may generate responses from all of the initialized hardware components that may be managed, in full or in part, by the remote access controller.

Using this inventory of managed hardware components, at 315, the firmware update service 410 of the remote access controller identifies hardware components to which the firmware update is potentially applicable. In some embodiments, the remote access controller may compare model number information included in the update notification to model numbers of hardware components from the collected inventory to determine the hardware components that may be operated using the updated firmware. Embodiments may additionally or alternatively utilize various types of information included in the update notification or information queried from the cloud system where the firmware image is stored in order to identify hardware components that may be operated using the updated firmware. From the inventory of managed hardware components that are compatible with the firmware update, at 315, the firmware update service 410 selects an initial target hardware component 425 to begin the firmware update. At 440, the firmware update service 410 may initiate the firmware update by configuring the target hardware component 425 for the update. In particular, this configuration may provide the target hardware component 425 with instructions for use in retrieving the firmware image that includes the updated firmware.

In order for the update to proceed, this firmware image must be transmitted to a local storage of the target hardware component 425. Firmware images may be relatively large files that may take several minutes to transmit to the managed hardware component, especially when transmitting the file using some of the sideband signaling pathways supported by a remote access controller. If the firmware image is transmitted solely over a relatively low bandwidth sideband management bus, a firmware image may take tens of minutes to transmit to a hardware component. During this interval in which the firmware image is being transmitted, numerous types of errors can occur in the IHS, elsewhere within a shared chassis, in the remote access controller, in the managed hardware component and/or in another hardware component that shares use of the signaling pathway being used to transmit the firmware image. Due to such errors, transmission of the firmware image may leave the managed hardware component in an undefined and/or inoperable state that requires manual administration of the device, and in some instances, may render the hardware component permanently inoperable. Accordingly, it is greatly preferred to avoid any errors during a firmware update and to minimize opportunities for firmware update errors that require manual intervention, or that otherwise remove an IHS from service.

As described, one existing technique for avoiding errors during a firmware update is to suspend thermal management procedures during the firmware update interval. In doing so, existing systems suspend all thermal management communications, thus depriving thermal management tools the information necessary to implement closed-loop cooling. As a result, existing systems resort to open-loop cooling during firmware updates, which results in wasted resources and unnecessary noise. Allowing thermal management communications to proceed during a firmware update presents possibilities for errors to occur in the firmware update process. For instance, a procedure for collecting temperature sensor data may itself encounter errors. Such errors may result in the sensor temporarily blocking communications on a management bus, thus resulting in timeout errors in the firmware process that is concurrently utilizing this same management bus, which may result in failure of the firmware update.

In embodiments, a minimum amount of thermal information that is required to support closed-loop cooling may be collected by the remote access controller that is managing the firmware update of a target hardware component 425. As described with regard to FIG. 2, remote access controller may include capabilities for sideband and inband communications with managed hardware components, which such communication may be implemented via various types of buses. One type of sideband bus utilized by remote access controllers according to embodiments is an I2C bus that is mastered by the remote access controller and used to communicate with one or more managed devices that are connected to the I2C bus. As described with regard to FIG. 2, the remote access controller may include I2C mutex that allows the remote access controller two switch between different I2C buses that are used to communicate with managed hardware component. Additionally, a remote access controller may also include an I2C co-processor that allocates time slices to managed components that share an I2C bus, thus allowing each management component an interval during which to send and received communications, such as PLDM management communications.

At 320, the remote access controller identifies the bus that will be used to transmit the firmware image to the target hardware component 425. Subsequently, based on the collected inventory of managed hardware components, the remote access controller identifies all other managed hardware components that share this bus with the target hardware component 425. As described, management operations supported by the remote access controller may include application layer communications, such as PLDM messages that may be used to implement rebootless firmware updates of certain hardware components. Accordingly, suspending all application-layer communications on a management bus other than a PLDM rebootless firmware update promotes the likelihood that the rebootless firmware update can be completed without errors.

Once the managed hardware components have been identified that share the bus being used for the firmware update of the target hardware component 425, at 325, the remote access controller suspends all application-layer communications by these managed hardware components on the firmware update bus, thus providing exclusive use of the available application-layer communications to the target hardware component 425. In illustrated in FIG. 4, at 445, the firmware update service 410 may configure transport layer communications 420 by the remote access controller to initiate procedures for implementing thermal monitoring during the update to the firmware of the target hardware component 425. In some embodiments, such configuration of transport layer communications 420 may be implemented by an I2C co-processor of the remote access controller, where this co-processor manages communications on the firmware update bus. In some embodiments, the I2C co-processor implementing transport-layer communications 420 on the firmware update bus may initiate monitoring for messages from the target hardware component 425, where such messages are part of the firmware update for which the target hardware component has been granted exclusive use of application-layer messaging on the firmware update bus.

As described, the remote access controller serves as the master of sideband management buses, such as I2C buses that may each include couplings to multiple managed hardware components. At 450, the application layer communications 415 of the remote access controller are configured to block messaging by all hardware components on the firmware bus, except for those by the target hardware 425. In providing the target hardware component 425 with exclusive use application-layer communications on the firmware update bus, the application layer communication 415 system of the remote access controller does not provide to the suspended hardware components any time slices for transmissions on the firmware update bus. In some embodiments, the I2C controller of the remote access controller may implement application layer communications 415, while in other embodiments the core logic of the remote access controller may be used to process application layer communications 415, such as PLDM communications using in management of an IHS. Without being granted any use of application-layer communication 415, these managed components cannot transmit or receive PLDM messages, thus suspending the communication of thermal management information within the application layer of the I2C connection between the remote access controller and the hardware components of the firmware update bus.

As indicated in FIG. 4, once configured according to embodiments, at 455, request for thermal information, such as data collected by thermal sensor 430 for use in closed-loop cooling, are blocked by the application-layer communications 415 of the remote access controller. In some embodiments, the application-layer communications 415 system may track blocked requests for thermal information. Embodiments may utilize this information in selecting thermal monitoring tasks to perform during the pendency of a replies by the application layer communications 415 to requests for transmission of blocks of the firmware image by the target hardware component 425, as described in additional detail below.

With application layer messaging suspended for all communications except for the firmware update of the target hardware component 425, at 330, the transport-layer communications system 420 of the remote access controller begins monitoring the firmware update bus for messages that are indicative of requests, at 460, for blocks of the firmware image to be transmitted to the target hardware component 425. As described, as the master of an I2C management bus, the remote access controller may utilize an I2C controller that allocates I2C bandwidth, sometimes in the form of time slice allocations, to managed hardware components that are coupled to this bus. In some embodiments, the I2C controller implementing transport-layer communications 420 may parse received packets for transport-layer information in order to identify, at 335, packets that are requests by the target hardware component 425 for blocks of the firmware image. In some embodiments, the transport-layer communications system 420 may parse transport layer header information for received communication packets on the firmware update bus, such as bit settings that specify the sender of a packet. In some embodiments, this bit setting may specify an address used by the remote access controller to communicate with target hardware component 425 on the firmware update bus. Based on an identified transport-layer sender of the received packet, the transport-layer communications system 420 may identify requests for blocks of the firmware image that are being transmitted on the bus by the target hardware component 420.

In some embodiments, the transport-layer communications system 420 may additionally or alternatively identify requests for blocks of the firmware image transmitted on the bus by the target hardware component 420 based on reported thermal data being embedded within some of the requests for blocks of the firmware image. In such embodiments, as part of setting up a firmware update, such as at 440, the remote access controller configures the target hardware component 420 for delivery of specific thermal monitoring data throughout the firmware update, where the thermal data is embedded by the hardware component 420 within requests for blocks of the firmware image that are transmitted by the hardware component in retrieving the firmware image. In some embodiments, the remote access controller configures the target hardware component 420 for delivery of thermal monitoring data at certain intervals, such as a frequency every 10 millisecond. Based on the configurations by the remote access controller, the target hardware component 420 embeds thermal monitoring data within header information of the packets that transmit the requests for blocks of the firmware image. Rather than being included in every request for blocks of firmware data, the target hardware component 420 includes thermal monitoring data in request packets at the specified frequency, such as in requests issued 10 milliseconds or more since the last request that included embedded thermal monitoring data.

In such embodiments, the thermal monitoring data may be embedded within the header of packets, such as PLDM packets, that are used by the target hardware component 420 to a request for blocks of the firmware image. In one example, the remote access controller may configure a target hardware component 420, such as a storage drive, to provide sensor reports from an embedded temperature sensor at a specified frequency during the pendency of a firmware update for the storage drive. In this instance, the storage drive includes temperature sensor reports within the header of packets that are requests for blocks of the firmware image, where the reports are embedded in request packets at the frequency specified by the remote access controller. Upon receiving a packet that is a request for blocks of the firmware image from the target hardware component 420, the transport-layer communications system 420 determines whether the header of the request includes any reported thermal monitoring data. If any such thermal data is received, it is forwarded to the thermal management applications 405 for use in supporting closed-loop cooling during the pendency of the firmware update.

Upon detecting a request for blocks of the firmware image that do not include reported thermal monitoring data, at 340, the remote access controller initializes a timer that measures the time elapsed since the request was received. In some instances, the requests do not include embedded thermal monitoring data due to lack of resources by the target hardware component 420 to support these capabilities. In some instances, a target hardware component may be initially or intermittently able to support the embedded thermal monitoring reports, and may thus be unable to issue such reports at the requested frequency throughout the duration of the firmware update. Accordingly, upon receipt of a request for blocks of the firmware image, where the request does not include embedded thermal monitoring data, the remote access controller may initiate a timer for use in determining the remaining time available to provide the target hardware component 425 with a reply before the target hardware component issues a timeout error due to lack of response to its request for blocks of the firmware image. During this interval, at 345, the remote access controller collects thermal data for one or more of the hardware components that share the bus being used update the firmware of the target hardware component 425. In the system of FIG. 4, the transport-layer system 420 polls a temperature sensor 430 for measurements that may be used to provide closed-loop cooling of the IHS. In some instances, the remote access controller may have sufficient time to poll multiple such sensors or other managed hardware components for thermal data before expiration of the timer and a response is required by the target hardware component 425. In some instances, the timeout interval for responses to request for blocks of the firmware image may only allow the remote access controller with sufficient time to poll single of these sensors for thermal data. In such instances, embodiments may utilize the list of blocked requests for thermal data, at 455, in order to determine the most requested thermal information that would be of most use in supporting closed-loop cooling.

While the polling of thermal information is being conducted, as indicated at 462 of FIG. 4, the requested blocks of the firmware image. As indicated at 350 of FIG. 3, after each sensor or hardware component has been polled for thermal data, the remote access controller determines whether the timer measuring the timeout interval for responses to requests for firmware image blocks is nearing expiration such that there is insufficient time for additional polling by remote access controller. In scenarios where the timer indicates sufficient time is available, embodiments returned to 345 and continue polling for thermal data from hardware components sharing the firmware update bus with the target hardware component 425. In scenarios where timer indicates insufficient time is available for further polling, at 355, the remote access controller suspends further polling of thermal data.

Upon suspending polling of thermal data, at 365 and at 470, the remote access controller responds to the request for blocks of the firmware image data to be delivered to the target hardware component 425. During this transmission, the remote access controller remains master of the bus used to transmit the firmware image to the hardware component and continues blocking application-layer traffic for all hardware components on this bus other than communications supporting firmware update of the target hardware 425. Accordingly, the transmission of blocks of the firmware image to the target hardware component 425 should proceed without interruptions and thus with reduced opportunities for disruptions that can result in errors in the firmware update process. In parallel with the response delivering blocks of the firmware image, at 360 and at 475, the thermal data collected by remote access controller is forwarded to the thermal management application 405 for use in supporting closed loop cooling of the IHS.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An IHS (Information Handling System) comprising:
one or more CPUs (Central Processing Units) utilizing one or more buses that connect to a plurality of hardware components of the IHS; and
a remote access controller supporting remote management of the Information Handling System (IHS), the remote access controller comprising a logic unit and a memory device having instructions stored thereon that, upon execution by the logic unit, cause the remote access controller to:
  initiate a firmware update for a first of the hardware components, where the firmware update is transmitted to the first hardware component via a bus that is mastered by the remote access controller;
  except for transmissions in support of the firmware update of the first hardware component, block communications on the bus;
  while blocking communications on the bus, detect a request by the first hardware component for transmission of a portion of the firmware update;
  determine a time for responding to the request by the first hardware component in order to prevent the request from timing out;
  prior to the time for responding to the request by the first hardware component, poll a second of the hardware components of the IHS that shares the bus mastered by the remote access controller for thermal data; and
  utilize the polled thermal data to provide closed-loop cooling of the IHS during the firmware update for the first hardware component.

2. The IHS of claim 1, wherein the update of the firmware of the hardware component comprises a rebootless update that does not include a reboot of the IHS.

3. The IHS of claim 1, wherein the blocking of communications on the bus comprises blocking application-layer messaging on the bus.

4. The IHS of claim 3, wherein the blocked application-layer messaging on the bus comprises blocking of any PLDM (Platform Level Data Model) communications by hardware components that share the bus with the first hardware component.

5. The IHS of claim 1, wherein the detection of the request for transmission of a portion of the firmware update comprises monitoring packets on the bus for transport layer communications that indicate a request by the first hardware component.

6. The IHS of claim 5, wherein the monitored packets are determined as a request by the first hardware component based on the detection of a transport-layer address used by the remote access controller to communication with the first hardware component.

7. The IHS of claim 1, wherein the bus mastered by the remote access controller comprises a sideband bus used to manage a plurality of the hardware components of the IHS.

8. The IHS of claim 7, wherein the sideband bus mastered by the remote access controller comprises an I2C (Inter-Integrated Circuit) bus.

9. The IHS of claim 1, wherein the second of the hardware components comprises a temperature sensor, and wherein the polling collects temperature measurements by the sensor.

10. The IHS of claim 9, wherein the collected temperature measurements enable the closed-loop cooling of the IHS during the update to the first hardware component.

11. A method for thermal monitoring during updates to firmware used by a managed hardware component of an Information Handling System (IHS), the method comprising:
   initiating, by a remote access controller of the IHS that operates separate from one or more CPUs (Central Processing Units) of the IHS and that provides remote management of the IHS, a firmware update for a first of the hardware components, where the firmware update is transmitted to the first hardware component via a bus that is mastered by the remote access controller;
   except for transmissions in support of the firmware update of the first hardware component, blocking communications on the bus;
   while blocking communications on the bus, detecting a request by the first hardware component for transmission of a portion of the firmware update;
   determining a time for responding to the request by the first hardware component in order to prevent the request from timing out;
   prior to the time for responding to the request by the first hardware component, polling a second of the hardware components of the IHS that shares the bus mastered by the remote access controller for thermal data; and
   providing closed-loop cooling of the IHS using the thermal data during the firmware update for the first hardware component.

12. The method of claim 11, wherein the update of the firmware of the hardware component comprises a rebootless update that does not include a reboot of the IHS.

13. The method of claim 11, wherein the bus mastered by the remote access controller comprises a sideband bus used to manage a plurality of the hardware components of the IHS.

14. The method of claim 13, wherein the sideband bus mastered by the remote access controller comprises an I2C (Inter-Integrated Circuit) bus.

15. The method of claim 11, wherein the second of the hardware components comprises a temperature sensor, and wherein the polling collects temperature measurements by the sensor.

16. A remote access controller supporting remote management of a plurality of managed hardware components of an Information Handling System (IHS), the remote access controller comprising:
   a logic unit and a memory device having instructions stored thereon that, upon execution by the logic unit, cause the remote access controller to:
      initiate a firmware update for a first of the managed hardware components, where the firmware update is transmitted to the first hardware component via a bus that is mastered by the remote access controller;
      except for transmissions in support of the firmware update of the first hardware component, block communications on the bus;
      while blocking communications on the bus, detect a request by the first hardware component for transmission of a portion of the firmware update;
      determine a time for responding to the request by the first hardware component in order to prevent the request from timing out;
      prior to the time for responding to the request by the first hardware component, poll a second of the hardware components of the IHS that shares the bus mastered by the remote access controller for thermal data; and
      utilize the polled thermal data to provide closed-loop cooling of the IHS during the firmware update for the first hardware component.

17. The remote access controller of claim 16, wherein the update of the firmware of the hardware component comprises a rebootless update that does not include a reboot of the IHS.

18. The remote access controller of claim 16, wherein the second of the hardware components comprises a temperature sensor, and wherein the polling collects temperature measurements by the sensor.

19. The remote access controller of claim 18, wherein the collected temperature measurements enable the closed-loop cooling of the IHS during the update to the first hardware component.

20. The remote access controller of claim 16, wherein the blocking of communications on the bus comprises blocking application-layer messaging on the bus.

* * * * *